(No Model.) 2 Sheets—Sheet 1.
D. J. C. ARNOLD.
COUNTER SHAFT HANGER.
No. 534,131. Patented Feb. 12, 1895.
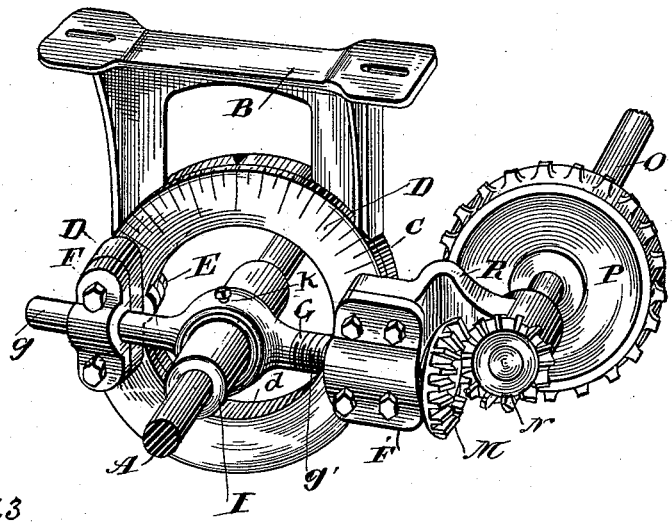
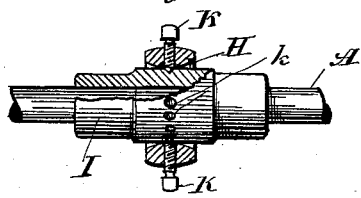
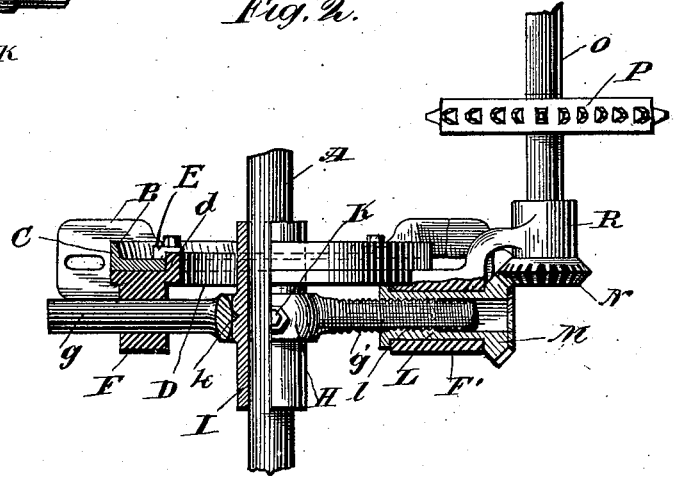

(No Model.) 2 Sheets—Sheet 2.

D. J. C. ARNOLD.
COUNTER SHAFT HANGER.

No. 534,131. Patented Feb. 12, 1895.

Witnesses
Inventor
Daniel J. C. Arnold
by Wm. M. Monroe
Attorney

UNITED STATES PATENT OFFICE.

DANIEL J. C. ARNOLD, OF NEW LONDON, OHIO.

COUNTER-SHAFT HANGER.

SPECIFICATION forming part of Letters Patent No. 534,131, dated February 12, 1895.

Application filed January 16, 1894. Serial No. 497,019. (No model.)

*To all whom it may concern:*

Be it known that I, DANIEL J. C. ARNOLD, a citizen of the United States, and a resident of New London, county of Huron, State of Ohio, have invented certain new and useful Improvements in Counter-Shaft Hangers, of which I hereby declare the following to be a full, clear, and exact description, such as will enable others skilled in the art to which it appertains to make and use the same.

My invention relates to improvements in adjustable hangers for counter-shafts, and its objects are to provide a hanger furnished with a movable bearing whereby adjustment can be made in the position of the counter-shaft and pulleys to take up the slack liable to arise in the belts from stretching or other causes and thus permit of the employment of endless belts.

My invention consists in the combination with a bracket or standard of a swiveled support for the shaft bearing and movable yoke, with the details of construction and arrangement of the various parts, as hereinafter described, shown in the accompanying drawings, and more specifically pointed out in the claims.

Figure 4:
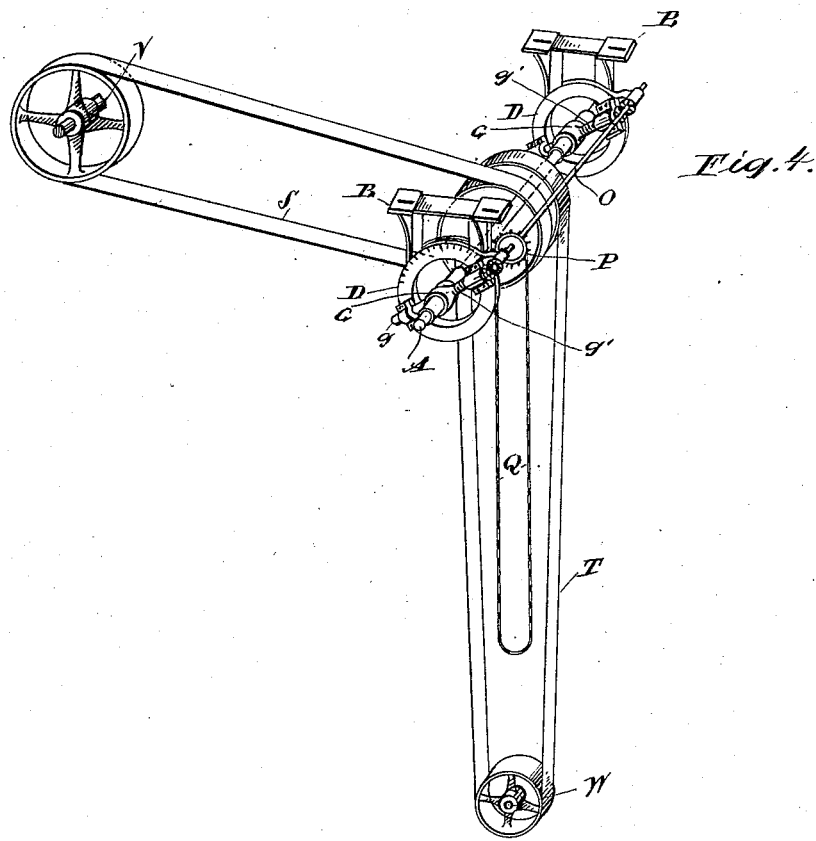
Figure 5:
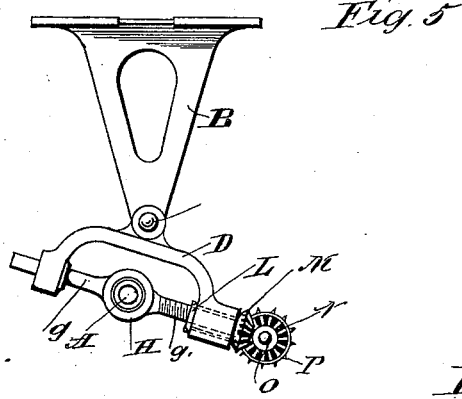

In the accompanying drawings, Figure 1 is a perspective view of one hanger and attachments. Fig. 2 is a bottom view of the same, the left side of the figure and gear-nut being shown in horizontal section on center line of shafts. Fig. 3 is a detail of the shaft bearing in vertical section. Fig. 4 is a view of main and counter-shaft bearings and machine belt, and Fig. 5 shows a modified form of an adjustable bearing.

In the figures, A represents the counter-shaft; B, the bracket or standard; C, an annular frame or extension from the bracket and preferably integral therewith.

D is an annular plate adapted to bear upon the frame C and provided with the annular flange *d* inserted within the opening in the plate C.

E, E, are clamps securing the annular plate and frame closely together but permitting free circular movement of the plate D upon the frame. This plate D serves to support the shaft and bearing as follows:

F. and F' are bearings upon the plate diametrically opposite for the transversely placed yoke G, provided with the central enlargement H, in which is placed a swiveled bearing I for the counter-shaft A. The yoke is also provided with lengthened extremities *g* and *g'*. This arrangement is seen clearly in Figs. 2 and 3 where I is a sleeve centrally mounted in the ring enlargement H, and provided with vertical pivot screws K for horizontal adjustment of the shaft. The inner wall of the enlargement is rounded as shown in Fig. 3 to give free action to the movements of the sleeve and shaft. A number of conical cavities *k* are arranged in circular line about the sleeve I for the insertion of the pivot screws K, so that the sleeve I may remain in one position horizontally—although the ring H may be tipped at varying angles. This is to insure a vertical position for any oil holes or cups that may be placed in the bearing sleeve I for the lubrication of the shaft.

It will be seen from Fig. 2 that one end of the yoke G is extended and smoothly finished as at *g* to move laterally through its bearing, while the opposite end is screw threaded at *g'* and is inserted in the sleeve L, threaded at *l* to act as a nut. The bevel gear M is integral with the outer end of the sleeve and is engaged by the pinion N upon the shaft O operated by the wheel and chain P and Q. A side bracket R supports this shaft and is integral with the plate D so as to rotate with it.

It is obvious that the revolution of the chain wheel and shaft will revolve the sleeve nut and draw the central bearing I to one side or the other of the circular opening, according to the direction in which the wheel is turned.

In Fig. 4 the utility of the device is apparent for the purpose of tightening two belts shown as S and T, the belt S connecting the counter shaft pulley with the main shaft V and the other belt with a machine pulley at W. A light shaft O long enough to connect both hangers is provided with similar bevel gears at either end engaging bevel gears provided with nut sleeves, as hereinbefore described, and serves to adjust both bearings of the counter-shaft simultaneously, so that as many hangers can be adjusted as desired by continuing the shaft to them. In this figure the yoke G is set diagonally in such a manner that both belts can be tightened when the yoke is run diagonally outward and upward without danger of cutting out either belt. The annular plate D is preferably graduated in equal parts so that each hanger can be easily set at the same angle when mounted.

In Fig. 5, a modified form of my invention is shown. To the lower end of the bracket is pivoted a supporting frame, provided with a bearing at each end, and in which boxes the yoke is placed. The fork is pivoted upon the lower edge of the hanger and, if desired, a graduated circle may be formed upon the joint for equal adjustment of two or more shafts. The advantages of an adjustable bearing for this purpose are great, especially in wood cutting machinery, or where work of great regularity is required, since it permits the use of an endless belt.

It has been found that with a laced belt, as heretofore employed, the lacings or fastenings will cause the pulley and cutter head to tremble and injure the uniformity of the work. Much better work can be done with an endless belt, which could not be employed without means for adjustment for tightening the belt as it stretches somewhat after a little use. It is also desirable to be able to tighten the belt for particular work for a few minutes only, and by means of this hanger a change is readily accomplished and the belts can be slackened when the machines are idle. A great saving of time, power and belts will be thus obtained.

If the hanger is used as a floor bracket, a hand wheel takes the place of the chain wheel.

Having described my invention, what I claim as new, and desire to secure by Letters Patent, is—

1. In a counter-shaft hanger, the combination with a fixed bracket, of an annular plate movably secured thereto and provided with a graduated index for angular elevation, a yoke longitudinally adjustable in said plate, a sleeve shaft bearing swiveled in said yoke, and means for moving the yoke longitudinally in said support, substantially as described.

2. In a countershaft hanger, the combination with a bracket for the counter-shaft of a longitudinally adjustable yoke, mounted in bearings upon said bracket, a shaft bearing swiveled in said yoke and means for moving said yoke longitudinally in its bearing, consisting in the threaded extremity of said yoke, a gear provided with integral sleeve nut, in which said threaded extremity is inserted, and driving shaft and gear, substantially as described.

DANIEL J. C. ARNOLD.

Witnesses:
WM. M. MONROE,
E. C. GREEN.